US008346782B2

(12) United States Patent
Zhang et al.

(10) Patent No.: US 8,346,782 B2
(45) Date of Patent: Jan. 1, 2013

(54) METHOD AND SYSTEM OF INFORMATION MATCHING IN ELECTRONIC COMMERCE WEBSITE

(75) Inventors: Xu Zhang, Hangzhou (CN); Qing-Yan Liu, Hangzhou (CN); Peng-Song Wu, Hangzhou (CN); Yi-Huo Ye, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/937,555

(22) PCT Filed: Aug. 18, 2010

(86) PCT No.: PCT/US2010/045846
§ 371 (c)(1),
(2), (4) Date: Oct. 13, 2010

(87) PCT Pub. No.: WO2011/025696
PCT Pub. Date: Mar. 3, 2011

(65) Prior Publication Data
US 2012/0143816 A1    Jun. 7, 2012

(30) Foreign Application Priority Data

Aug. 27, 2009  (CN) .......................... 2009 1 0171350

(51) Int. Cl.
*G06F 17/00* (2006.01)
(52) U.S. Cl. ....................................... 707/748; 707/751
(58) Field of Classification Search .......... 707/748–759, 707/764–771
See application file for complete search history.

(56) References Cited

U.S. PATENT DOCUMENTS

| 6,947,924 | B2 | 9/2005 | Bates et al. |
| 7,089,237 | B2 | 8/2006 | Turnbull et al. |
| 7,519,595 | B2 | 4/2009 | Solaro et al. |
| 7,546,295 | B2 | 6/2009 | Brave et al. |
| 7,685,117 | B2 | 3/2010 | Gross |
| 2004/0093321 | A1 | 5/2004 | Roustant et al. |
| 2006/0106670 | A1* | 5/2006 | Cai et al. .................. 705/13 |

(Continued)

OTHER PUBLICATIONS

The Chinese Office Action mailed May 9, 2012 for Chinese patent application No. 200910171350.3, a counterpart foreign application of U.S. Appl. No. 12/937,555, 11 pages.

*Primary Examiner* — Wilson Lee
(74) *Attorney, Agent, or Firm* — Lee & Hayes, PLLC

(57) ABSTRACT

The present disclosure describes an information matching method and information system. The method collects characteristic data of category plurality of categories of network behavior of a plurality of network users; groups the network users into a plurality of clusters based on the characteristic data; sets weight of the characteristic data; receives a search request from one of the plurality of network users; obtains search results according to the search request; inquires a historical record of clicking operation on at least some of the search results made by at least some of the network users in one of the clusters which contains the one of the plurality of network users; calculates a respective rank value of each of the at least some of the search results based on the historical record of clicking operation of at least some of the network users and the weight of the characteristic data; sorts of the search results to arrange the search results according to the rank values of the search results in a descending order from high rank to low rank; and causes the sorted search results to be displayed.

20 Claims, 7 Drawing Sheets

U.S. PATENT DOCUMENTS

| | | |
|---|---|---|
| 2007/0233671 A1* | 10/2007 | Oztekin et al. .................... 707/5 |
| 2007/0239682 A1 | 10/2007 | Arellanes et al. |
| 2007/0255702 A1* | 11/2007 | Orme ............................... 707/5 |
| 2008/0004986 A1* | 1/2008 | Choe ............................... 705/26 |
| 2008/0103721 A1 | 5/2008 | Tsai et al. |
| 2008/0270220 A1 | 10/2008 | Ramer et al. |
| 2008/0294602 A1 | 11/2008 | Permandla et al. |
| 2009/0100015 A1 | 4/2009 | Golan |
| 2009/0177644 A1* | 7/2009 | Martinez et al. .................. 707/5 |
| 2009/0198688 A1 | 8/2009 | Venkataraman et al. |
| 2009/0300007 A1 | 12/2009 | Hiraoka |
| 2010/0030894 A1* | 2/2010 | Cancel et al. ................. 709/224 |
| 2010/0114929 A1 | 5/2010 | Bonchi et al. |
| 2010/0161592 A1 | 6/2010 | Zhao |

* cited by examiner

YAHOO! KUOBEI BEIJING OTHER CITY ▶
CHINA YAHOO

| FREE INFORMATION PUBLISHING | 1. SELECT INFORMATION CATEGOR | 2. FILL IN DETAILS | 3. RELATED WEB STORES | 4. COMPLETE PUBLISHING |

PLEASE SELECT THE CATEGORY OF INFORMATION YOU WANT TO PUBLISH

| REAL ESTATE | RESTAURANT AND FOOD | ENTERTAINMENT | HOUSEWORK/REPAIR/ DECORATION | TRAVEL/BUSINESS TRIP |
|---|---|---|---|---|
| APARTMENT | DISHES | ENTERTAINMENT PLACES/ | BABYSITTING | TRAVEL AROUND |
| RESALE HOME | WESTERN FOOD | NIGHTCLUBS/CYBERCAFES | NANNIES/BABY ATTENDANTS | DOMESTIC TRAVEL |
| WANT TO RENT | DRINKS | FITNESS/LEISURE | PART-TIME WORKERS | OVERSEAS TRAVEL/HONG |
| WANT TO SELL | BANQUET | FACIAL/BODY SHAPING | PLUMBING | KONG AND MACAU TOUR |
| NEW HOME – ORDINARY | BUFFET | HAIR CUT/HAIR DRESSING | CLEANING | HOTEL RESERVATION |
| RESIDENCE | DESSERT | CINEMA/RECREATION AND | REPAIR | VISA APPLICATION SERVICES |
| NEW HOME – CONDO | BREAD/CAKES | SPORTS/CLUBS | RENOVATION | INDIVIDUAL TOUR/SELF- |
| NEW HOME – VILLA | SPECIAL DISHES | PUBLIC VENUE/SCENERY | HOUSE/FURNITURE MOVING | GUIDED TOUR |
| OTHER NEW HOMES | PACKAGES | AREAS | PUBLISHING REQUESTED | |
| | | OTHER LEISURE AND | INFORMATION | |
| | | ENTERTAINMENT | | |

METHOD AND SYSTEM OF INFORMATION MATCHING IN ELECTRONIC COMMERCE WEBSITE

CROSS REFERENCE TO RELATED PATENT APPLICATIONS

This application is a national stage application of an international patent application PCT/US10/45846, filed Aug. 18, 2010, entitled "Method and System of Information Matching in Electronic Commerce Website", which claims priority from Chinese Patent Application No. 200910171350.3, filed Aug. 27, 2009, entitled "Method and System of Information Matching in Electronic Commerce Website," which applications are hereby incorporated in their entirety by reference.

TECHNICAL FIELD OF THE PRESENT DISCLOSURE

The present disclosure relates to computer data processing techniques, and particularly to information matching and information system for electronic commerce website.

TECHNICAL BACKGROUND OF THE PRESENT DISCLOSURE

A search engine is a tool for searching and matching information. Typical search engines have become a highly effective platform for information publication, aggregation and display, and have been popularly employed in the field of electronic commerce. The working principle of a search engine is that when a user inputs key words, the search engine searches for the information which matches the key words, and sends back results of the matched information to the user. However, a search engine typically identifies the demand of a user based on the key words input by the user, but the demand of the user is ever changing. It is very hard to correctly express the desire of a user. For example, when a user inputs the words "waterproof case", it may mean "waterproof case for a camera", and may also mean "waterproof case for a cell-phone". The user may want to buy some kind of waterproof case, or may just want to know the related information about a waterproof case.

The personal character such as life style, habit and religion of different users varies from user to user, but a search engine is unable to distinguish the difference between different users. Therefore the search engine can only give a stereotypical result of a search to the user. Take the search for "Restaurant" as example. A rich user may desire search results for the luxurious restaurants, but a poor user may desire search results for the common restaurants. Hence, giving the search results of luxurious restaurants to a poor user is a waste of time and energy for the poor user. Besides, the results do not benefit the luxurious restaurants as well.

Furthermore as for the user of a cell-phone, it is not easy to input key words, and the over-shortened key words do not clearly express the information needed by the user. For example, when a user searches for "Shen Mei Barbershop", there are a lot of chain stores of the barbershop. It is difficult to determine information shall be given to the user. Presently, the only way to solve the problem requires the user to repeatedly simplify and refine the key words. This method not only decreases the search efficiency but also causes inconvenience to the user.

Therefore, it is hard to guarantee the results of a search of information may be of interest to the user when applying existing information matching techniques on a search engine.

A pay-per-click (PPC) system also has the function of information publication and information searching. The difference in the PPC system is that it sorts the results according to the fees paid by a publisher for each click of the search result. The more fees that are paid, the higher the published information is placed in a list of search results. That provides the publisher an greater chance to present the information before a user's eyes, i.e., the publisher can control the display of advertisement by means of controlling the fees paid for each click.

Thus, PPC can guarantee the information of the publisher who paid more fees will appear at the top of the list of search results. Whether the information matches the intended desire of the user is not the focal point of concern of the PPC. Hence PPC has more concern for the interest of the publisher, for example a merchant, but neglects the interest of the information receiver, such as a user.

Traditional advertisement publishing also has the function of information publication. The development of traditional advertisement in the internet has gone through many generations. From the initial stage of selected subject column delivery (such as delivery of the automobile advertisement through the automobile channel of Sina Website), to choosing key words from a webpage and carrying out key words delivery (such as the Ad Sense of Google), and then to the targeted delivery (such as double click and Ten Cent) through user behavior analysis, clustering, and path analysis, the effect of internet advertisement has become more and more evident. However, essentially, traditional advertisement entails delivering information according to the owner of the advertisement, but not according to the idea of a consumer.

Thus, traditional advertisement is not designed for providing the matched information needed by a user, but is for locating potential customers by straight forward delivery of the advertisement to the potential customer targeted by the publisher. However, no matter the improvement, the essence is always the advertisement. The advertisement will appear before the user when the user intends to obtain information of another nature. This causes interference to the normal activities of a user. Similarly a traditional advertisement is also focused more on the interest of the publisher, i.e., the merchant, and neglects the interest of the information receiver, i.e., the user.

SUMMARY OF THE PRESENT DISCLOSURE

The present disclosure describes an information matching method and system for an electronic commerce web site. By providing the most desired information to the information receiver, a win-win result for both the information publisher and information receiver can be achieved.

In one aspect, an information matching method for an electronic commerce website provided in the present disclosure includes a number of actions described below.

The characteristic data of different types of network behavior of network users is collected by a search engine server. Based on each type of network behavior, clustering of network users is carried out according to the characteristic data and weight of each type of characteristic data is set up for carrying out the clustering process.

The search engine server receives a search request from a specific network user, and obtains results from the search according to the requested search.

The search engine server requests the historical record of clicking operation of at least some of the network users in the cluster of a specific network that a specific user belongs to.

The search engine server calculates and obtains a rank value of the results of the search based on the historical record of clicking operation of at least some of the network users and the weight of different types of characteristic data for a cluster.

The search engine server sorts the results of the search based on the rank value to arrange the results of the search in a descending order from high rank to low rank, and sends the sorted results of the search back to the terminal equipment of the specific user.

The network behavior may include online trading or web comments.

The characteristic data of the network behavior may include online transaction records or web comment record.

In another aspect, a method of clustering network users based on types of network behavior and according to the characteristic data includes a number of actions described below.

Of all network users whose characteristic data of network behavior are not collected are grouped into the same cluster.

The remaining network users are grouped, or clustered, according to the characteristic data of network behavior into pre-determined sets of clusters.

The result of the clustering is arranged in the form of a data sheet and is kept in a data base.

The procedure of clustering according to the characteristic data of network behavior into pre-arranged sets of clusters may include a number of actions described below.

If characteristic data of network behavior is online trading, the clustering may be carried out according to whether the commodity information in the online trading records are similar to each other, and the network users who have purchased similar commodities may be gathered in the same cluster.

The clustering procedure is completed when the number of clusters reaches the pre-determined number of clusters.

The procedure of clustering according to the characteristics data of network behavior and the pre-arranged sets of clusters may includes a number of actions described below.

If characteristic data of network behavior is web comment records, the clustering of network users would be carried out according to the cluster to which the merchant belongs, or according to the number of network users who appear in the web comment records of two merchant network users. The overlapping proportion may be based on the proportion of the number of network users to the total number of network users who click the merchant network.

The space between a merchant network used by employing the overlapping proportion is calculated, and clustering based on the space is carried out.

Conversely the clustering of consumer network users is carried out according to the results of clustering of the merchant network users.

The clustering procedure is completed when the number of clusters reaches the pre-determined number of sets of clusters.

The manner of collecting the network behavior characteristic data of network users by the search engine server may include: collecting through the server log analysis system, collecting through the log system of a network user's activities, collecting through a geographical information system, or collecting through a data interface of a third party, or collecting through the assembly of the above-mentioned manners.

The manner of collecting the network behavior characteristic data of network users may further include a number of actions described below.

The weight of geographical location information is set up.

The rank value of each result of the search is calculated based on the weight of the geographical location information and the weight of different characteristic data for carrying out clustering.

The results of the search are arranged in a descending order from high rank value to low rank value.

The search engine server, when receiving a search request of a specific network user, may receive the key words from the specific network user, and/or a search request triggered by a mouse clicking operation by the specific network user.

The present disclosure also provides an information matching system which comprises an information acquisition system for collecting the network behavior characteristic data of network users, a retrieval system, results page generating system, and a sorting system.

The information acquisition system carries out clustering of network users with different network behaviors and according to the characteristic data, and sets up the weight of different characteristic data for carrying out clustering.

The retrieval system receives the search request of a specific network user, and based on the request obtains results of the search, requests the historical record of clicking operation on each of the results by other network users in the cluster containing the specific network user, obtains the rank value of the result of the search by employing the historical record of clicking operation of other network users and the weight of the characteristic date for clustering, and then arranges the rank value in a descending order from high rank value to low rank value.

The results page generating system displays the arranged results of the search to the information receiver. The retrieval system may include a search engine for receiving the search request of a specific network user and carrying out a search to obtain search results according to the search request.

The sorting system requests the historical record of clicking operation on each of the results of the search made by the network users in the cluster, calculates the rank value for the results of the search by employing the historical record of clicking made by other network users and the weight of the characteristic data for clustering, and then arranges the results of the search in a descending order from high rank value to low rank value.

The sorting system may include: a first setting module, an inquiry module, a statistical module, and a sorting module.

The first setting module sets the weight of the characteristic data for clustering.

The inquiry module requests the historical record of clicking operation on each of the results of a search made by each network user against each of the already obtained results of the search.

The statistical module performs statistical analysis of the historical record of clicking operation on each results of a search, and keeps the statistical data in a database in the form of a data sheet.

The sorting module inquires, against the retrieved results of a search, the historical record of clicking operation of at least some of the network users in the cluster containing the specific network user when the specific user carries out a search.

Based on the weight calculation on the rank value of each result of the search, the results of the search are arranged in a descending order from high rank value to low rank value.

The sorting module may include a second setting module that sets the weight of geographical position information.

The rank value of each result of the search is calculated by employing the weight of the geographical position information and the characteristic data for clustering. The results of the search are arranged in a descending order from high rank value to low rank value.

The information matching method and information system for electronic commerce as provided in the present disclosure can be employed for generally analyzing the attribute of an information publisher and receiver through the information published and received by the publisher and receiver, and provides the matched information to the information receiver according to the demand expressed by the receiver, so as to achieve information matching and the win-win result for both of the information publisher and receiver in electronic commerce applications.

DESCRIPTION OF THE DRAWINGS

In order to more clearly describe the embodiment of the present disclosure, a brief description of the drawings is provided herewith. The drawings described in the following are only examples of the present disclosure. It is understood that other similar examples would be apparent to those skilled in the art without departing from the spirit of the present disclosure, and thus similar examples are still covered by the appended claims.

FIG. 3 is a practice drawing showing the embodiment of the present disclosure and illustrating the selection of the information classification to be published in the information editing system.

FIG. 4 is an example of the selection in the classification of a restaurant as shown in FIG. 3.

DETAILED DESCRIPTION OF THE PREFERRED EMBODIMENTS

This section more clearly and completely describes the techniques employed in the embodiments of the present disclosure combined with the drawings. The embodiments herein illustrated are only the examples of the various embodiments, and do not cover all the examples of the inventive concept. Therefore, any modification of the present disclosure made by those skilled in the art without departing from the spirit of the present disclosure are still covered by the appended claims.

Figure 1:
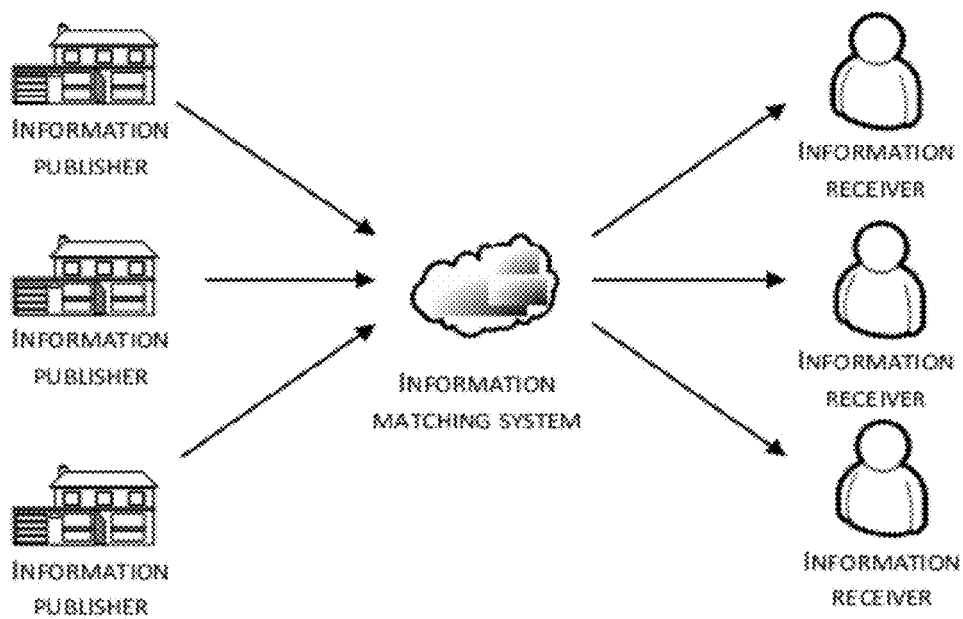
FIG. 1 is a schematic drawing showing the relation between the roles involved in the present disclosure.

Three roles are involved in the present disclosure: an information publisher, an information receiver, and an information matching system. The information publisher is the party that provides the information, and the information receiver is the party that needs the information. However, it should be noted that these two roles are distinguished conceptually. In the real life one may act as an information publisher, and can also act as an information receiver. Using a student as an example, when the student is looking for a part time job, the student is an information publisher. Meanwhile the student also needs to know information about advertised part time work, and therefore at the same time becomes an information receiver. The information matching system provided in the present disclosure serves as a platform for information exchange between the information publisher and information receiver. The relationship between these three roles is shown in FIG. 1.

Figure 2:
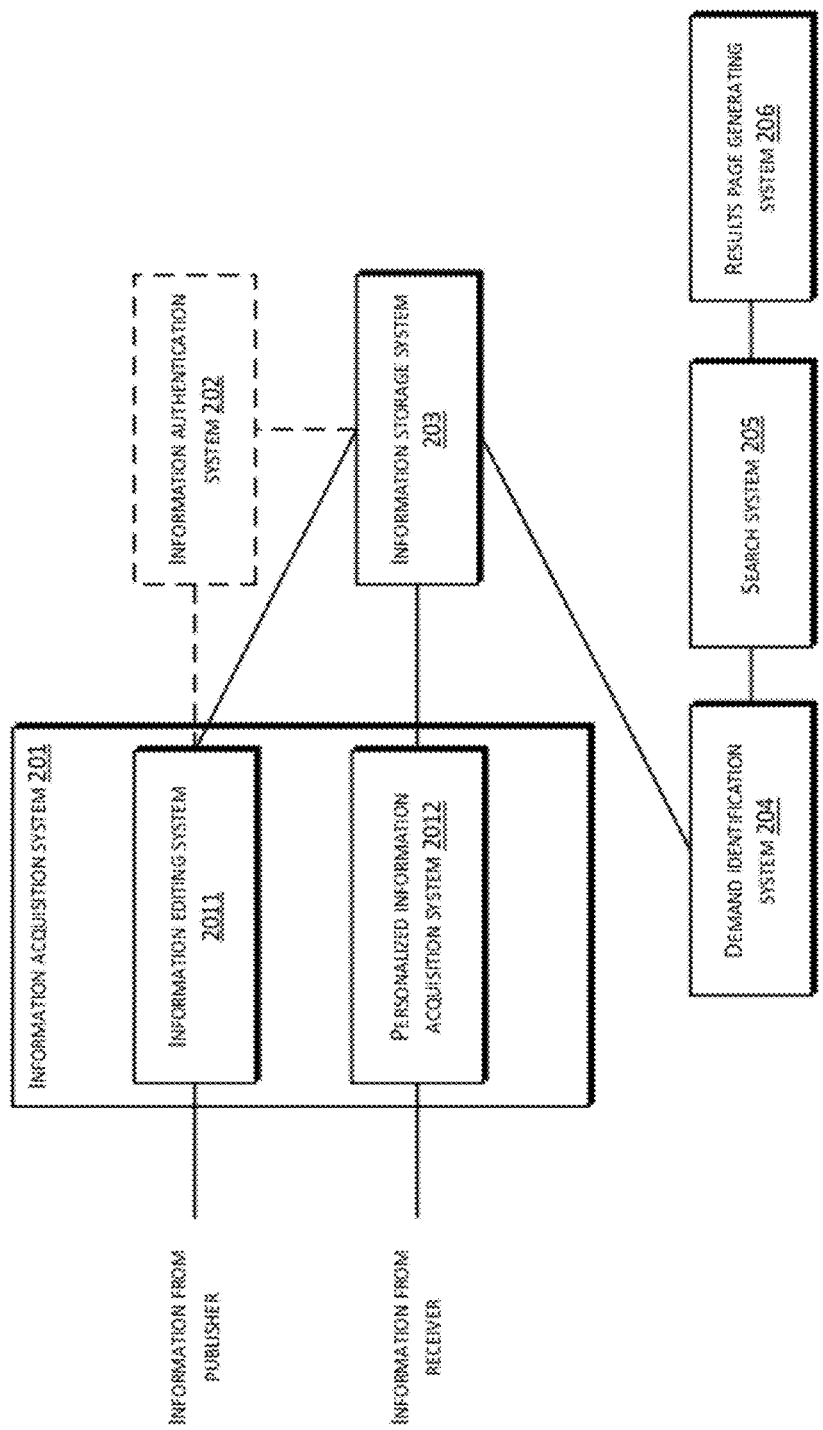
FIG. 2 is a schematic drawing showing the structure of the information matching method of the present disclosure.

Shown in FIG. 2 is the schematic drawing of the network structure of an information matching system of the present disclosure.

The information acquisition system 201 collects information. The information editing system 2011 of the information acquisition system collects basic attribute information of an information publisher and the information to be published. The personalized information acquisition system 2012 collects personalized data of the information receiver, and carries out clustering of the personalized data to obtain the personalized attribute information. The information storage system 203 keeps, or stores, the basic attribute information of the information publisher, the information to be published by the publisher, and the personalized attribution information of the receiver.

In addition, the network structure of the information matching system of the present disclosure can optionally include an information authentication system 202 that authenticates the basic attribute information of the publisher collected by the information acquisition system 201. When the acquired information passes the authentication, a notification may be sent to the information storage system 203.

When the information receiver undergoes online activities, the demand identification system 204 obtains the user mark and online activity information of the receiver according to the trigger information. The retrieval system 205 generates the search results according to the online activity. The search results include the published information from the publisher for matching the search order. The results page generating system 206 displays the search results to the information receiver.

However, the notion of the information acquisition system 201, information authentication system 202, information storage system 203, demand identification system 204, retrieval system 205, and results page generating system 206 is logical concept, and these systems can be arranged in such a way that all the systems are implemented in a server, or one or more of them may be implemented in one or more servers.

The functions provided by the information matching system include: collecting the information from the information publisher and receiver, analyzing the attribution information of the publisher and receiver, and providing the matched information according to the demand expressed by the information receiver. Accordingly, the information matching can be achieved and can provide the win-win result to both the information publisher and information receiver when embodiments of the present disclosure are applied in electronic commerce.

By combining the network structure as shown in FIG. 2, a detailed description is given from two angles of information publisher and information receiver. As for information publisher, two main steps are involved and are described below.

First Step

Figure 4:
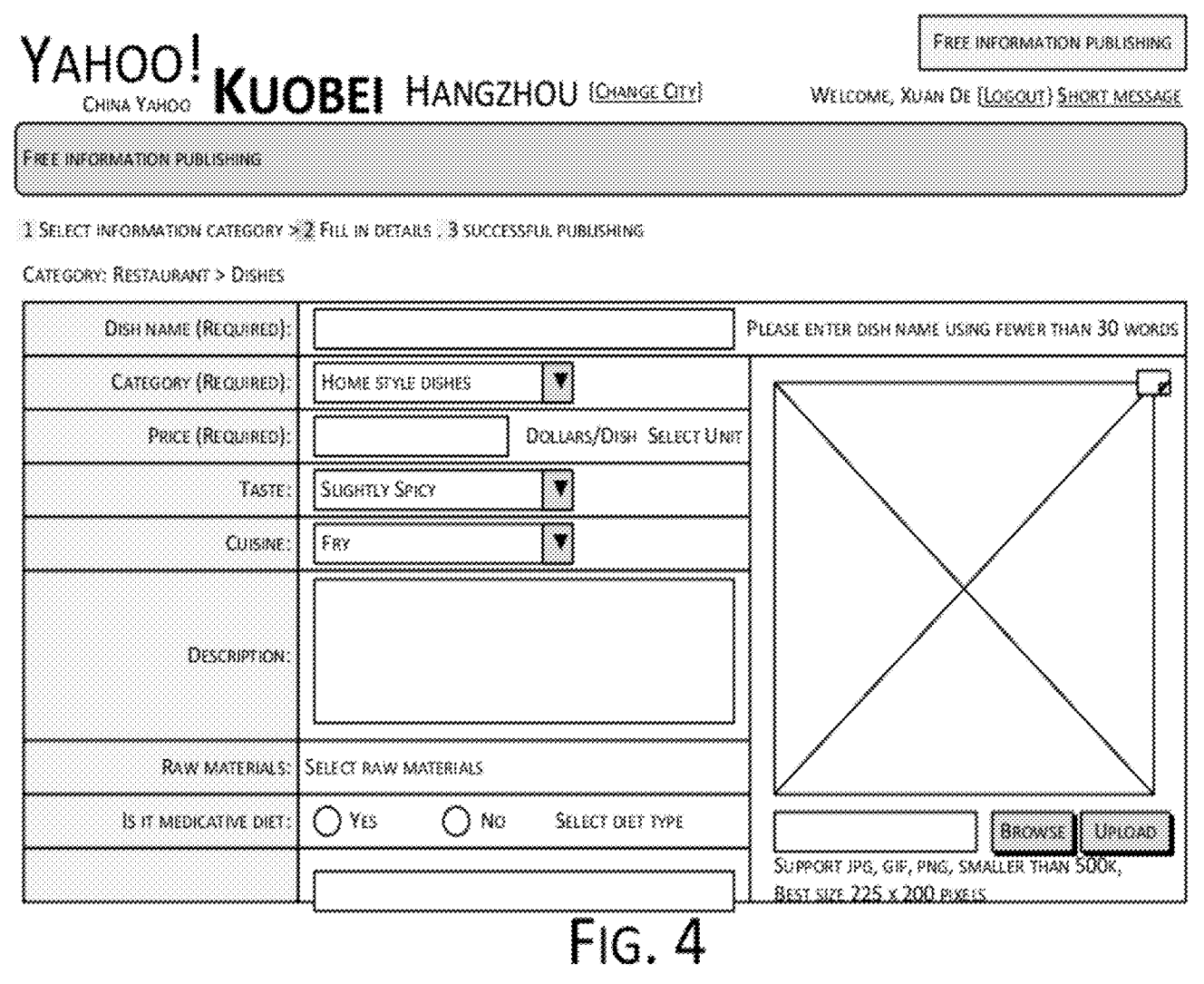

The information publisher enters the information to be published and its attribute information into the information storage system 203 through the information editing system 2011. The information editing system 2011 may be a software system operated in a process server. The communication between the server and the outside can be achieved through the standard Hyper Text Transfer Protocol (HTTP). The information publisher can visit the web pages of the information editing system 2011 through a common browser, and enters messages on the webpage. For example, an information publisher of a restaurant desires to publish information concerning restaurant services. First he selects the category of information, and after registering the information editing system 2011 will ask the information publisher to enter the related information according to the condition of the restaurant industry as shown in FIG. 3 and FIG. 4. It should be understood that if the input is from another industry, the information to be entered in the webpage shown in FIG. 4 is different. This is because FIG. 3 and FIG. 4 are an embodiment designed only for the restaurant industry. The webpage contents, layout, picture and color etc. for other possible embodiments may differ from each other.

Figure 5:
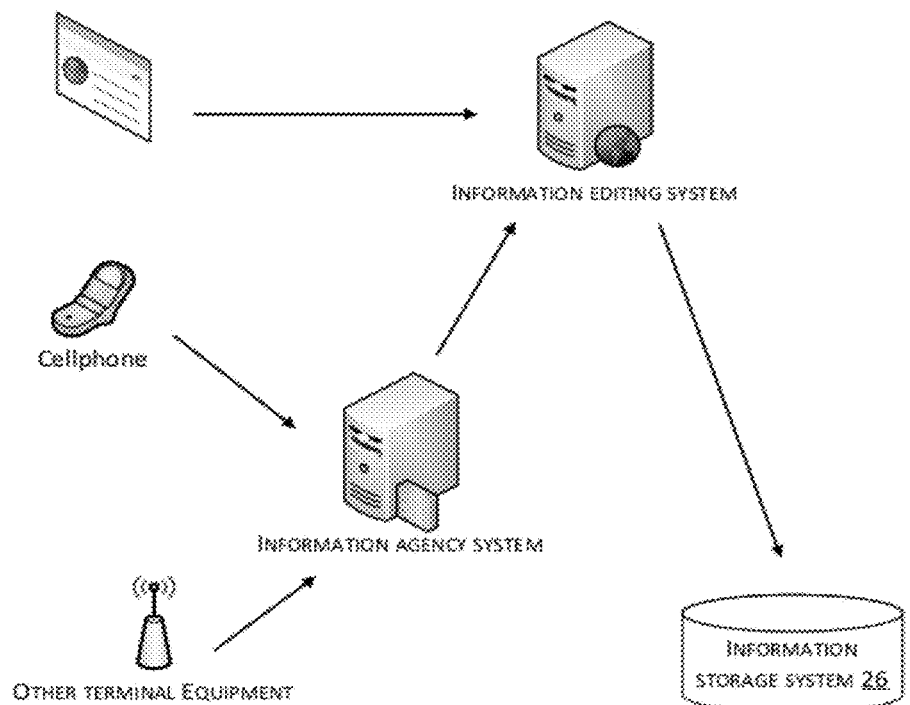
FIG. 5 is a schematic drawing of an example of embodiment of the present disclosure showing how the information is connected to the information editing system through information agency system.

The information publisher may also publish the information by other means such as cell-phone messages or through other terminal equipment. However, if the publishing information is not made through HTTP, an information agency system is required for transferring the information into HTTP to communicate with the information editing system 2011. As shown in FIG. 5 the information can be transferred to the information editing system 2011 by cell phone or other terminal equipment through the information agency system.

After delivery of information, the information will be kept in an information storage system, such as the information storage system 203 for example, which may include one or more databases. The one or more databases can be distribution type or non-distribution type. Here the database is a general idea and can be any kind of database, and not limited to a specific type of database such as Oracle database, My SQL database and SQL Server, etc.

Second Step

The information delivered by the publisher will be examined by a system administrator through information authentication system, such as the information authentication system 202 for example. The information authentication system 202 is also a software system operated in a system server. Communication with the outside can be achieved through standard HTTP, and the system administrator can make visitation through a browser.

If necessary for practical purpose, a third party authentication company can be entrusted by the system administrator. The third party authentication company or other third party institution may carry out examination and authentication of the information published by the publisher so as to prove the authenticity and reliability of the information published by the publisher.

For example, in the above-mentioned case, an information publisher provides the information about restaurant services including the name of the restaurant, information about dishes, Business Registration Certificate, Sanitation Certificate, etc. The system administrator may entrust a third party company to carry out authentication of this information. After cross-authentication through different channels by the third party company, if the information is deemed authentic and reliable the feedback of the information will be received by the system administrator, and the information will pass the examination handled by the system administrator.

If the information fails to pass the examination, the system administrator may reject the information, or may re-edit the information to conform with the requirements.

After passing examination, the information will be transferred by the information examination system into the approved database, such as the information storage system 203, to be used by other systems.

The purpose of the aforementioned step is for proving the authenticity and reliability of the information provided by the information provider so as to better maintain the trustworthiness of electronic commerce activity. However in the practical application this step may be omitted.

Stated above is the procedure when facing the information publisher. The description below pertains to the information receiver.

First Step

The characteristic data of the network user is collected through the personalized information acquisition system 2012. The personalized information acquisition system 2012 is a software system operated in a server, and includes the following sub-systems:

a) Server log analysis system: This system is for analyzing user characteristics by employing a server log through the analysis of a user visitation record. The server log may be the basic service software operated in a server.

An example record of a software operations log is an Apache HTTP server log.

From the server Apache log the user's visitation record can be obtained. As an example for illustration purpose only, a user may visit the following during the past 7 days:

/patch 1/file 1

/path 2/file 2

- - -

- - -

These visitation records are used as the characteristic data of the user, and are kept in the information storage system 203.

b) User activity log system: This system is for analyzing the characteristics of a user by employing the user activity log. The user activity log may include the activity recorded by an application program provided by the website, and can use the log records of these services. For example, the Forum Program provided to a user by a website may record the IP address registered by the user, the registration time, post title, and post contents of the user in the log. The user log system can obtain characteristic data of the user from these logs, and keep the user's characteristic data in the information storage system 203.

An example of the user activities recorded by the Forum program is shown in Table 1.

TABLE 1

| Time | Registered IP | Page | Post title | Post contents |
|------|---------------|------|------------|---------------|
| 2009.6.12. 10:11:12 | 12.34.56.78 | Talk about everything | Ha Ha | Water boiled fish for lunch |
| 2009.6.12 10:23:31 | 12.34.56.78 | Message interchange | Recommend | The seafood Chafing dish is delicious. |

The user activity log takes the key words in "page", "Post title" and "Post contents" as user characteristic data.

Another example is an online trading system which may also keep a user's trading records in a log. The user activity log system can also obtain user's characteristic data from the user's trading records, and keep the characteristic data in the information storage system 203. An example of user activity recorded by an online trading system is shown in Table 2.

TABLE 2

| Time | Registered IP | Order No. | Commodity purchased | Transaction amount |
|---|---|---|---|---|
| 2009.6.12 10:11:12 | 12.34.56.78 | Q123456 | Miniskirt | RMB32.00 |
| 2009.6.12 10:23:31 | 12.34.56.78 | Q123457 | Foaming face wash | RMB20.00 |

The user activity log system takes "commodity purchased" and "Transaction amount" as user characteristic data, and keeps the characteristic data in the information storage system 203.

c) Geographical information system: This system is for collecting and analyzing the geographical position information of the user. The position coordinates of a user can be obtained through a positioning system such as the Global Positioning System (GPS) or a cell-phone Base Station Position System. The geographical information system will record and keep the geographical coordinates in the information storage system 203.

d) Third party data interface: Owing to the characteristics of the internet structure, the information matching system of the present disclosure can obtain user data from inside the system. If the information acquisition system 201 is to be more effective, a third party data interface may be required for integrating the data in other servers to the system of the present disclosure. For example when company A operates the system of the present disclosure, it can seek cooperation with company B's website to connect the user activity log of company B's website to the system of company A. Through the interface, standard HTTP may be utilized to communicate with the server.

The above-mentioned sub-systems can be flexibly arranged according to the practical condition of the embodiments. It is not required to include all sub-systems of the present disclosure.

Further, user characteristic data, i.e., the user information source, can include online transaction records and web comments, etc. It is to be understood that most users in a system are "silent user", i.e., most of the users don't leave their characteristic data in a system. The users browse the website at will, but lack interaction with the website. This will limit the amount of information, but will not affect the normal operation of the system.

Second Step

Clustering of the user characteristic data collected in step 1 is carried out. Clustering may include grouping users having similar characteristic data, or characteristics, to form a cluster. The overall characteristics of members of a cluster are taken as the characteristics of each member in the cluster. If it is found from the user characteristic data that user A and user B both have the same visitation records, or both have similar key words, or both have purchased similar commodities in a transaction record, then user A and user B would be gathered as a cluster. The results of clustering are then kept in the information storage system 203. There are already existing methods of clustering. In the following, a clustering method is introduced to illustrate the procedure of clustering.

The system may classify each user as a merchant user or a consumer user. A merchant user is one who publishes product or service information in an electronic commerce website. A consumer user is one who obtains the information published by a merchant user from an electronic commerce website. Consumer users are clustered according to the collected characteristic data of consumer users' network behavior such as what time of the day each consumer user carries out online trading and web comments. The clustering of the consumer users may be carried out according to the characteristic data in the online transaction records, or the clustering could also be carried out according to the characteristic data in the web comment records. When clustering is carried out according to characteristic data, the consumer users who have no information records may be gathered first to form a cluster. The remaining consumer users may be arranged into several clusters according to the configuration of the system administrator. Here, we will classify the consumer users into three clusters for illustration purpose only.

A clustering method employing the characteristic data in an online transaction record can be described as follows: clustering is based on whether the commodities in the online transaction records of the consumer users are similar to each other. In this example, the consumer users who have purchased similar commodities may be gathered as a cluster.

As for clustering by employing the web comments made by the consumer users against the information published by the merchant user, an example process is described below.

a) Those who have no records may be gathered as a cluster;
b) Clustering of consumer users is carried out according to the classification of web comments or according to the cluster catalogue of merchant users. Generally the catalogue mentioned here means the industry or field of products related by the information published by the merchant.

An alternative clustering method provided by the present disclosure and based on the web comment records is described below.

Based on the information published by a merchant user for analyzing the information of a consumer user in the web comment records, the number of consumer users who appeared in the web comment records of two merchant users is counted, and the overlapping proportion according to the proportion of the number of consumer users who appear in the web comment records of two merchant users to the total number of consumer users making web comments against the merchant users is obtained. The space between the merchant users is then calculated based on the overlapping proportion. For example, assuming the statistical results show that 80% of the consumer users in the web comment records of the merchant user A have also made comments against the merchant user B, hence the space between merchant user A and merchant user B is as follows:

$$\frac{1-P}{P} = \frac{1-80\%}{80\%} = 0.25$$

Based on a pre-selected threshold, such as 0.5, the merchant users with threshold values less than 0.5 are gathered into a cluster. Thus merchant users A and B are gathered into a cluster. Conversely clustering of consumer users may be carried out according to the cluster catalogue of the cluster of merchant users. Assuming the results of clustering in this example are arranged with merchant user A and merchant user C into a cluster, while merchant user D, merchant user E and merchant user F are arranged into another cluster. The clustering of consumer users may be done by grouping consumer users who made web comments against merchant user A and merchant user C into a cluster, and the consumer users who made web comments against merchant user D, merchant user E and merchant user F gathered into another cluster.

c) When the number of clusters obtained reaches the number of pre-determined sets of clusters, clustering is completed. More clusters can be obtained simply by carrying out a more refined classification of clusters. The calculation of clustering can be achieved under off-line condition.

d) Through the above-mentioned clustering method, clustering can be carried out for all consumer users, and the results of the clustering can be kept in a database for further purposes.

For the example, the results of clustering of consumer users 1, 2, 3, 4, 5 and 6 shown in Table 3 below can be obtained.

TABLE 3

|  | Cluster 1 | Cluster 2 | Cluster 3 |
|---|---|---|---|
| Online transaction record | 1, 2 | 3, 6 | 4, 5 |
| Web comments record | 2, 3, 4 | 1, 5 | 6 |

Third Step

Search by a search engine is carried out, followed by sorting and rearranging the results of the search. The search engine mentioned here is a general concept. It does not necessarily mean the search engine of a website or the product of a company, but just a computer network system having the following characteristics:

1. The input of the system is a key word, and can include several parameters; and
2. The output of the system is the search results obtained according to the input information and is from the inside of the system.

The procedure for carrying out a search by employing a search engine is an existing technique. The concern of the present disclosure is not the application of the search engine in conducting a search. Rather, what is provided by the present disclosure is how to carry out the sorting and rearrangement of the results obtained by the search engine. Hence only a simple description is given to the application of a search engine in conducting the search.

The procedure for a search employing a search engine is described below.

When a network user carries out online activity, the demand identification system 204 receives the request sent out by the network user, such as key words input or search request triggered through mouse clicking operation. The search request triggered through the mouse clicking operation of the network user can be the network user clicking on some pre-determined category, and in turn the clicking triggers the corresponding search request. The demand identification system 204 transfers the request to a retrieval system to carry out the search and generate results of the search according to the search request.

The contents of the search results may include the information the publisher wants to publish such as name and business of the publisher, as well as descriptions relating to the name of the information publisher, etc. This information is kept in the information storage system 203 by the publisher. Further, all the afore-mentioned information the publisher wants to publish is, in general, a set of structural data. The set of structured data means the data can be kept in the information storage system 203 in a structured form such as a data sheet.

The procedure of sorting and rearrangement of the search results made by the search system 205 includes a number of actions described below.

1) The weight of characteristic data is set for carrying out clustering. In one embodiment of the present disclosure, two categories of characteristic data such as "online transaction records" and "web comment records" are taken as examples. The weight of "online transactions" is set to be 40% and the weight of "web comments" is set to be 60%.

2) Based on each search result obtained, the search engine inquires for the historical record of clicking operation of each user against each result of the search. For example, there may be 10 sets of records obtained in a search. These search results may be noted as result 1, result 2 . . . and result 10. The historical record of activity of the user is recorded in a log system, including the historical record of the number of times of clicking operation made by the user against result 1, result 2 . . . and result 10, respectively.

3) Statistical analysis of the historical record of clicking operation of each result of the search is carried out, and the data is kept in a database. For example, there may be a search for "water boiled fish", result 1: consumer user 1 clicked on it 1 time, consumer user 2 clicked on it 10 times, as shown in Table 4 below.

TABLE 4

|  | Result 1 | Result 2 | . . . | Result 10 |
|---|---|---|---|---|
| Consumer user 1 | 1 | 3 |  | 10 |
| Consumer user 2 | 10 | 1 |  | 2 |
| Consumer user 3 | 2 | 0 |  | 1 |
| . . . |  |  |  |  |
| Consumer user 100 | 0 | 1 |  | 2 |

4) When a user performs a search, based on the results of the search retrieved by a search engine, the historical record of clicking operation on the search results made by at least some of the users in the cluster which the specific user belongs to is inquired. Based on the weight set in the First Step described above, the rank of each search result is calculated, and the results of the search are rearranged in a descending order from high rank to low rank. For example, when consumer user 2 searches for "water boiled fish" the procedure for rearranging the results retrieved by the search engine such as result 1, result 2 . . . result 10 is provided below.

4.1 Based on the cluster table, the users in the cluster to which the consumer user 2 belongs are inquired. Using Table 3 as an example, the following can be obtained: When clustering is based on the "online transaction record", user 1 and user 2 belong to the same cluster. When clustering is based on the "web comments record", user 2, user 3 and user 4 belong to the same cluster.

4.2 From the historical record of clicking operation of a user, the historical record of clicking operation made by the users of a cluster to which the consumer user 2 belongs is obtained. Using Table 4 as an example, and relating to result 1, consumer user 1 clicked 1 time, consumer user 2 clicked 10 times, consumer user 3 clicked 2 times, and consumer user 4 clicked 1 time.

4.3 The rank of each search result is calculated based on the results of inquiry.

The calculation method is as follows: For the cluster of "online transaction records", result 1-Consumer user 1 clicked 1 time, consumer user 2 clicked 10 times, so the rank may be calculated as follows:

Rank=(1+10)*40%=4.4

As for the cluster of "web comments record":

Result 1: Consumer user 2 clicked 10 times, consumer user 3 clicked 2 times, consumer user 4 clicked 1 time, therefore Rank=(10+2+1)*60%=7.8

Total rank=4.4+7.8=12.2

The rank of other search results can also be obtained similarly.

4.4 The calculated rank values are arranged in a descending order from high to low.

If the geographical positioning system is added into the system of the present disclosure, a geographic information system (GIS) retrieval system can be included. The GIS retrieval system is a selectable sub system. If the GIS retrieval system is eliminated, the system of the present disclosure may no longer possess the function of geographical position retrieval, but the major function of the system of present disclosure would not be affected.

If the geographical position information is added into the system, the above-mentioned rank value may be calculated as follows:

$$Rank = \text{Weight of characteristic data for clustering} + \text{weight of geographical position information.}$$

If the geographical positioning information is not added in the system, then the above-mentioned rank value equals the weight of characteristic data for clustering.

Fourth Step

The results page generating system 206 for displaying the sorted results to the user is an automatic web page generating system operated in a server connected to another system, and will integrate the core contents after sorting to form the results page according to a pre-set web page format to display the results page to the user.

In comparing the method of the present disclosure with a conventional search engine, one difference is that when using the system of the present disclosure the input of the user may include, but not be limited to, search request in a form other than key words, e.g., user's online activities can be employed as a retrieving condition for the information matching process. Since the present disclosure has taken into consideration the user's personalized attributes, it can present different results to different users.

In comparing the method of the present disclosure with the method of pay-per-click (PPC), one difference is that in PPC the sorting is made according to the fee per click paid by the information publisher. The information being placed at a preceding position is presented to the visitor, so that the publisher can control the display of advertisement through payment. However, in the present disclosure the display of information is controlled according to the extent of matching between the information publisher and the information receiver.

In comparing the method of the present disclosure with the traditional advertisement, one difference is that the essence of advertisement is always the advertisement, no matter how apparent. The advertisement cannot rid of its essence. That is, information is delivered according to the idea of the owner of advertisement but not the idea of the consumer. In the present disclosure, though the advertisement behavior analysis and clustering method are employed, the purpose pursued by the present disclosure is the matching between the information publisher and the information receiver. Unlike conventional advertisement, the present disclosure will not interfere with the information receiver, e.g., consumer users.

Figure 6:
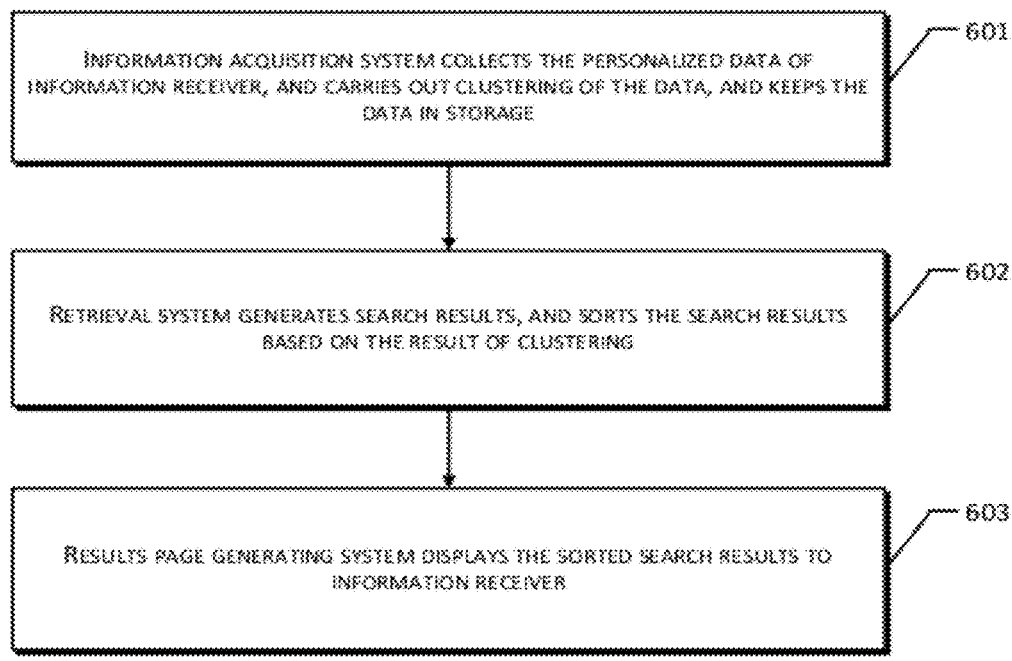
FIG. 6 is an example of embodiment of the present disclosure showing the flow diagram of the information matching method employed in an electronic commerce website.

FIG. 6 is a flow diagram of information matching method of an embodiment of the present disclosure implemented on an electronic commerce website. The matching method includes a number of steps described below.

At step 601, the information acquisition system 201 collects personalized data of a consumer user, carries out clustering of the personalized data, and keeps the results of the clustering. The procedure of collecting the personalized data of a consumer user by the information acquisition system 201 for clustering may include a number of actions described below.

First, those consumer users who have no record are grouped into one cluster. Next, clustering of the remaining consumer users based on the characteristic data and the pre-determined sets of clusters is carried out. The results of clustering are kept in a database in the form of a data sheet.

In the case in which characteristic data is an online transaction record, the procedure for clustering based on the characteristic data and the pre-determined sets of cluster may include a number of actions described below.

Clustering is carried out based on whether the commodity information in the web transaction records of the consumer users are similar to each other. Those consumer users who have purchased similar commodities are then grouped into a cluster. When the number of clusters reaches a pre-determined number of sets, the clustering is completed.

In the case in which the characteristic data is web comment records, the procedure for clustering based on the characteristic data and the pre-arranged sets of clusters may include a number of actions described below.

Clustering of the consumer users, based on the cluster to which the merchant user belongs or based on the number of consumer users who appear in the web comment records of two merchant users, is carried out. Based on the proportion of the number of the consumer users to the total number of consumer users who made web comments against the merchant users, the overlapping proportion is obtained. The space between merchant users is calculated and clustering of the merchant users based on the space is carried out. Conversely, based on the clustering of merchant users, clustering of consumer user is carried out. When the number of clusters reaches a prearranged number, clustering is complete.

In one embodiment, a method of collecting the personalized data of the information receivers by the information acquisition system 201 includes one or more of a variety of means, such as: collection through a server log analysis system, collection through a user activity log, collection through a geographical information system, collection through a data interface of a third party, and collection through any combination of the above-mentioned methods.

At step 602, the search system 205 generates the results of a search according to the web activity of the information receiver, and sorts the search results based on the results of clustering in storage.

If there is no need to include geographical positioning information, then the procedure of sorting the search results based on the clustering results in storage includes a number of actions described below.

The weight of characteristic data for clustering is set.

Based on each search result, the historical record of clicking operation of each result of each user is inquired.

Statistical analysis of the historical record of clicking operation of each search result is carried out, and the data is kept in a database in the form of a data sheet.

When a user performs a search based on the retrieved search results, the system inquires the historical record of clicking operation made by at least some of the users in the cluster which includes the user performing the search. Based on the weight, the rank of each result of the search is calculated. Based on the calculated rank value, the results of the search is sorted and arranged in a descending order from high rank value to low rank value.

If geographical positioning information is to be included in the system, sorting of the search results based on the clustering results in storage may be carried out through the procedure described below.

The weight of the geographical position is set.

The procedure for sorting the search results based on the clustering results in storage includes setting the weight of the characteristic data for clustering.

The historical record of clicking operation of each search result made by each user is inquired based on each obtained result search.

Statistical analysis on the historical record of clicking operation of each obtained and retrieved search result is carried out, and the data is kept in a database in the form of a data sheet.

When a search by a user is done, based on the retrieved results of the search the system will inquire the historical record of clicking operation of at least some of the users in the cluster in which the user belongs, calculate the rank of each search result based on the weight of the geographical position information and the weight of the characteristic data for clustering, and then based on the calculated rank value, sort the search results and arrange the results in a descending order from high rank to low rank.

At step 603, the results page generating system 206 displays the sorted search results to the information receiver. Before or after collection of the personalized data of the information receiver by the information acquisition system 201, the information acquisition system 201 may also collect the basic attributes of the information publisher and the information to be published, and keep the collected date in storage.

After the basic attribute information of the information publisher and the information to be published by the publisher are collected by the information acquisition system 201, and before the information is kept in storage, the procedure may also include authentication of the basic attribute information of the information publisher. The information may be kept in storage after passing authentication. The purpose of the procedure is to verify the authenticity and reliability of the information being collected. In some embodiments the step of authentication may not be included in the practical application of the present disclosure.

The application of the information matching method on electronic commerce as provided by the present disclosure can generally analyze the attribute information of information publishers and receivers through collected information published and received by a publisher and receiver, and can provide the information to match the demand expressed by the information receiver. This method also enables a win-win result for both the information publisher and receiver in the application of the disclosed embodiments in electronic commerce.

Figure 7:
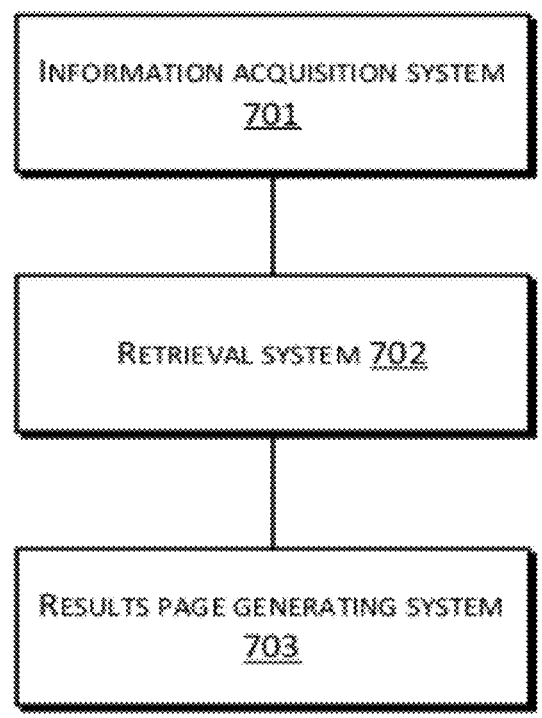
FIG. 7 is a schematic drawing of an example of embodiment of the present disclosure showing the structure of the information matching system employed in an electronic commerce website.

The present disclosure also provide an information matching system for an electronic commerce website as shown in FIG. 7 which comprises an information acquisition system 701, a retrieval system 702 and a results page generating system 703.

The information acquisition system 701 collects the personalized data of an information receiver, carries out clustering of the personalized data, and keeps the results of the clustering in storage.

The retrieval system 702 generates results of the search based on the online activities of an information receiver, and sorts the search results based on the results of clustering in storage.

The results page generating system 703 displays to the information receiver the search results after sorting.

The retrieval system 702 may further include a search engine and a sorting system as described below.

The search engine generates results of a search based on the online activities of an information receiver.

The sorting system sorts the search results based on the clustering results in storage.

The sorting system of the retrieval system 702 may include a first setting module, an inquiring module, a statistical module, and a sorting module.

The first setting module sets the weight of the characteristic data of clustering.

The inquiring module inquires the historical record of clicking operation of each user on each search result.

The statistical module carries out statistical analysis of the historical record of clicking operation of each search result, and keeps the data in a database in the form of a data sheet.

The sorting module inquires, based on the retrieved search results, the historical record of clicking operation of at least some of the users in a cluster which include the specific user who is performing the search. Based on the weight, the sorting module calculates the rank value of each search result, and then sorts the search results based on the calculated rank value to arrange the results in a descending order from high rank to low rank.

The sorting system of the retrieval system 702 may additionally include a second setting module for setting the weight geographical position information.

The first setting module for setting the weight of the characteristic carries out clustering.

The inquiring module inquires the historical record of clicking of each user on each result of search.

The statistical module performs statistical analysis of the historical record of clicking of each obtained search result of search, and keeping the data in a database in the form of data sheet.

The sorting module, based on the retrieved search results, the historical record of clicking of at least some of the user in a cluster which contains the user who is carrying out the search, and the module will calculate the rank value of each search result based on the weight of geographical position information and the weight of characteristics data for clustering, and sort the search results by arranging them in the order from high rank to low rank.

The information matching system provided in the present disclosure, when applied on electronic commerce, can make general analysis of the attribute of both the information publisher and information receiver through the information published and received by the publisher and receiver, and can provide the information to match the demand expressed by the receiver. With the disclosed technique, the matching of information can be achieved, and a win-win result for both the information publisher and receiver can also be achieved when the matching of information is applied in electronic commerce.

The relationship terms used in the text of this application, such as first and second, are only for distinguishing an object or operation from another object or operation, but not for defining or implying any practical relation or order between the object or operation. The terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment. For the sake of convenience in description, when describing the above-mentioned system, the division was made based on function. It is a matter of course that when the present disclosure is put into practice, the function of each system may be achieved by one or more than one software or hardware.

It is to be understood that the practice of the present disclosure of employing software and the necessary hardware platform is apparent to those skill in the art. Therefore, the technology of the present disclosure, or the part of the present disclosure which makes a contribution to the existing technology, can be embodied in the form of computer software product. The computer software product can be stored in a computer-readable storage media such ROM/RAM, disc or CD carrying a certain number of commands which can enable computer equipment (may be personal computer, server or network equipment etc.) to execute the examples of the embodiment of the present disclosure or the method described in some parts of the present disclosure.

Each example of this embodiment of the present disclosure is described in a progressive manner. Similar parts between different embodiments can serve as a reference to each other, and the focal point description of each embodiment is always the part different from the other embodiment. Since the basic method is the same, some parts of an embodiment may just be briefly described, these parts can refer to the related parts of the descriptions of other embodiment.

The present disclosure can be applied on different kinds of general or special purpose computer systems or equipment such as a personal computer, server, portable or hand held equipment, platen equipment, multiprocessor system, microprocessor based system, set-top box, programmable consumptive-electronics equipment, network PC, miniature type computer, large type computer and any distributed type computer system formed by the combination of any of the above etc.

The present disclosure can be described in the context of the executable computer command of a computer such as a programming module. In general, the programming module comprises the routine, program, object, component and data structure etc. for executing a specific mission or achieving the specific abstract data, and can be applied on a distributed computing environment. The programming module can also be arranged in the local and remote computer media including storage equipment.

The above-mentioned description is only the preferred embodiments of the present disclosure and which do not limit the range of the appended claims, and any modification or equivalent replacement or improvement of the present disclosure shall also be covered by the appended claims of the present disclosure.

What is claimed is:

1. A computer-implemented method for information matching, the method comprising:
    collecting characteristic data of network behavior of a plurality of users;
    grouping multiple users of the plurality of users into one cluster, the multiple users not having the collected characteristic data of network behavior;
    grouping remaining users of the plurality of users into one or more predetermined clusters based on the characteristic data of network behavior;
    storing results of the one cluster and the one or more predetermined clusters in a database;
    setting weight of the characteristic data;
    receiving a search request from a user device of a user of the plurality of users;
    obtaining search results based on the search request;
    inquiring a historical record of clicking operation on multiple search results of the search results, the clicking operation being made by a plurality of users in a cluster that contains the user;
    calculating rank values of the multiple search results based on the historical record of the clicking operation and the weight of the characteristic data;
    sorting the multiple search results based on the rank values in a descending order from a high rank to a low rank; and
    causing the sorted search results to be displayed.

2. The method of claim 1, wherein the network behavior is associated with online transactions or web comments, and wherein the characteristic data is associated with the online transactions or the web comments.

3. The method of claim 1, wherein the grouping the remaining users of the plurality of users into one or more predetermined clusters based on the characteristic data of network behavior comprises:
    if the characteristic data of the network behavior is associated with online transactions, grouping the remaining users based on multiple items associated with the online transactions, the multiple items sharing one or more properties.

4. The method of claim 1, wherein the grouping the remaining users of the plurality of users into one or more predetermined clusters based on the characteristic data of network behavior comprises:
    if the characteristic data of the network behavior is associated with web comments, grouping the remaining users based on at least one of users receiving the web comments or
    a number of the remaining users who make the web comments against the users receiving the web comments and a number of the plurality of users who make the web comments against the users receiving the comments.

5. The method of claim 1, wherein the collecting characteristic data of network behavior of a plurality of users comprises:
    collecting the characteristic data based on at least one of server log, network activities log, geographical information, or an interface of a third party.

6. The method of claim 1, further comprising:
    setting weight of geographical position information, wherein the calculating rank values of the multiple search results comprises calculating the rank values of the multiple search results based on the weight of geographical position information.

7. The method of claim 1, wherein the receiving a search request from the user comprises receiving a key word or selection one user of the plurality of users as the search request.

8. One or more non-transitory computer-readable storage medium encoded with instructions that, when executed by a processor of a server, perform acts comprising:
    collecting activity records of a plurality of users;
    grouping multiple users of the plurality of users into one cluster, the multiple users not having an activity record;
    grouping remaining users of the plurality of users into one or more predetermined clusters based on the collected activity records;
    storing results of the one cluster and the one or more predetermined clusters in a database;
    setting weight of the activity records;

receiving a search query from a user device associated with a user of the plurality users;

obtaining multiple results based on the search query;

retrieving a historical record of clicking operation on one or more results of the multiple results, the clicking operation being made by users of a cluster that includes the user;

calculating rank values of the multiple results based on the historical record of clicking operation and the weight of the activity records associated with the cluster;

sorting the multiple results based on the rank values in a descending order from a high rank to a low rank;

enabling a display of the sorted search results.

9. The one or more non-transitory computer-readable storage medium of claim 8, wherein the activity records include activities associated with at least one of online transactions or web comments.

10. The one or more non-transitory computer-readable storage medium of claim 8, wherein the grouping other users of the plurality of users into the one or more predetermined clusters based on the collected activity records comprises:

grouping the other users of the plurality of users into the one or more predetermined clusters based on multiple items associated with online transactions, the multiple items sharing one or more properties.

11. The one or more non-transitory computer-readable storage medium of claim 8, wherein a number of the one or more predetermined clusters is less than a predetermined number.

12. The one or more non-transitory computer-readable storage medium of claim 8, wherein the collecting the activity records of the plurality of users comprises collecting the activity records based on at least one of a server log, a network log, or geographical information.

13. The one or more non-transitory computer-readable storage medium of claim 8, wherein the calculating the rank values of the multiple results comprises calculating the rank values further based on geographical information associated with the plurality of users.

14. The one or more non-transitory computer-readable storage medium of claim 8, wherein the search query includes at least one of a keyword or selection of the user.

15. A computer system for information matching, the system comprising:

one or more processors;

memory; and an information matching application, stored in the memory and executable on the one or more processors, configured to:

collect online activity records of a plurality of users;

grouping multiple users of the plurality of users into one cluster, the online activity records of the multiple users being not available;

grouping remaining users of the plurality of users into one or more clusters based on the collected online activity records;

storing results the one cluster and the one or more clusters in a database;

setting weight of the online activity records;

receiving a search query from a user device associated with a user of the plurality users;

obtaining multiple results based on the search query;

retrieving a historical record of clicking operation on one or more results of the multiple results, the clicking operation being made by users of a cluster that includes the user;

calculating rank values of the multiple results based on the historical record of clicking operation and the weight of the online activity records associated with the cluster;

sorting the multiple results based on the rank values in a descending order from a high rank to a low rank, and enabling the multiple results to be displayed.

16. The computer system of claim 15, wherein the collecting the online activity records of the plurality of users comprises collecting the online activity records based on at least one of a server log, a network log, or geographical information.

17. The computer system of claim 15, wherein the calculating the rank values of the multiple results comprises calculating the rank values further based on geographical information associated with the plurality of users.

18. The computer system of claim 15, wherein the search query includes at least one of a keyword or selection of the user.

19. The computer system of claim 15, wherein the activity records include activities associated with at least one of online transactions or web comments.

20. The computer system of claim 15, wherein a number of the one or more predetermined clusters is less than a predetermined number.

* * * * *